United States Patent [19]

Haddock

[11] 4,388,190
[45] Jun. 14, 1983

[54] PLATE ASSEMBLY AND METHOD FOR INSTALLING SAME IN A SEPARATION DEVICE

[76] Inventor: Nicky M. Haddock, 11907 Mile Dr., Houston, Tex. 77065

[21] Appl. No.: 24,557

[22] Filed: Mar. 28, 1979

[51] Int. Cl.³ .............................................. B01D 21/00
[52] U.S. Cl. ..................................................... 210/522
[58] Field of Search ................... 55/440, 278; 210/521, 210/522

[56] References Cited

U.S. PATENT DOCUMENTS

| 367,308 | 7/1887 | Macnab | 210/522 |
|---|---|---|---|
| 372,216 | 10/1887 | Gaillet | 210/522 |
| 758,484 | 4/1904 | Stewart | 210/521 |
| 1,732,386 | 10/1929 | Sprockhoff | 210/521 |
| 1,834,534 | 12/1931 | Richards et al. | 55/440 |
| 1,864,511 | 6/1932 | Jones | 210/513 |
| 1,946,414 | 2/1934 | Schmid | 260/144 |
| 2,119,013 | 5/1938 | Kerns et al. | 210/57 |
| 2,207,399 | 7/1940 | Gaertmer | 210/521 |
| 2,673,451 | 3/1954 | Gariel | 61/2 |
| 2,868,384 | 1/1959 | Puddington | 210/521 |
| 3,346,122 | 10/1967 | Cornelissen | 210/522 |
| 3,454,165 | 7/1969 | Cornelissen | 210/522 |
| 3,491,892 | 1/1970 | McCann | 210/521 |
| 3,529,728 | 9/1970 | Middelbeek et al. | 210/522 |
| 3,563,389 | 2/1971 | Mizrahi | 210/532 |
| 3,666,111 | 5/1972 | Pielkenrood et al. | 210/521 |
| 3,666,112 | 5/1972 | Pielkenrood et al. | 210/521 |
| 3,721,347 | 3/1973 | Pielkenrood et al. | 210/519 |
| 3,727,770 | 4/1973 | Mochizuki | 210/522 |
| 3,782,551 | 1/1974 | Soldan | 210/179 |
| 3,782,557 | 1/1974 | Pielkenrood | 210/521 |
| 3,797,668 | 3/1974 | Pielkenrood et al. | 210/522 |
| 3,813,855 | 6/1974 | Hill et al. | 55/440 |
| 3,837,501 | 9/1974 | Pielkenrood | 210/522 |
| 3,847,813 | 11/1974 | Castelli | 210/232 |
| 3,899,427 | 8/1975 | Connelly et al. | 210/521 |
| 3,914,175 | 10/1975 | Kunz et al. | 210/498 |
| 3,933,654 | 1/1976 | Middelbeek | 210/521 |
| 3,957,656 | 5/1976 | Castelli | 210/521 |
| 4,028,256 | 6/1977 | Pielkenrood | 210/519 |
| 4,054,529 | 10/1977 | Pielkenrood | 210/521 |

FOREIGN PATENT DOCUMENTS

| 1098155 | 7/1955 | France . |
| 907 | of 1886 | United Kingdom . |
| 17980 | of 1897 | United Kingdom . |

Primary Examiner—Ivars C. Cintins
Attorney, Agent, or Firm—Pravel, Gambrell, Hewitt, Kirk & Kimball

[57] ABSTRACT

Plate assembly and method for installing same in a separation device for separating components from a multi-component carrier liquid having components of a specific mass differing from that of the carrier liquid wherein the assembly includes at least two parallel separating plates being separated by spacer members mounted with the top and bottom portion of the separating plates and extending along the plate surfaces thereof for engaging and spacing ajacent separating plates for enhanced separation within the separation device. In practicing the method of the present invention, the plate assembly is established by inserting individual separating plates within the separation device one at a time with each such separating plate having its own spacer member therewith for spacing adjacent plates from one another and for forming a plate assembly for a separation device.

14 Claims, 7 Drawing Figures

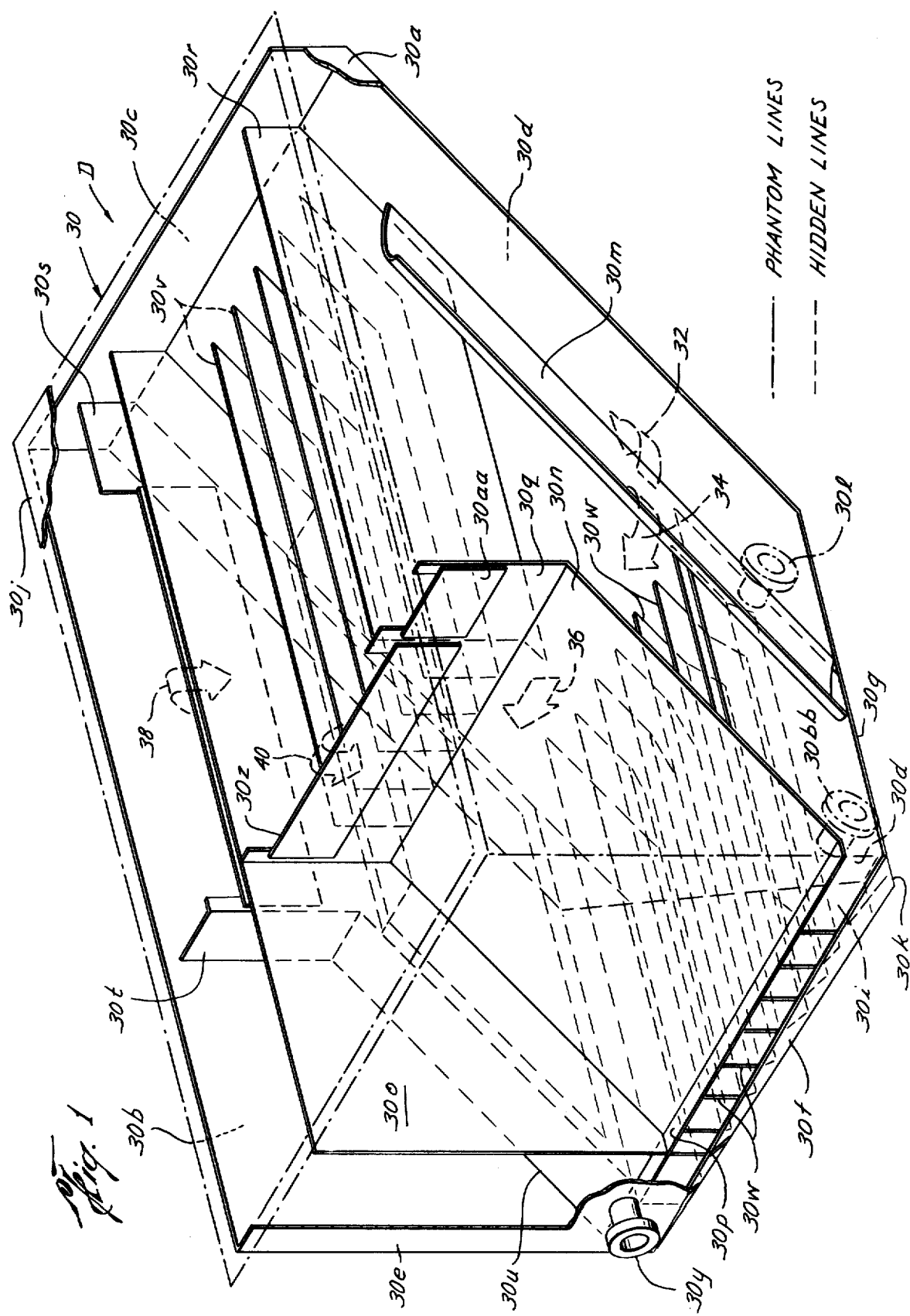

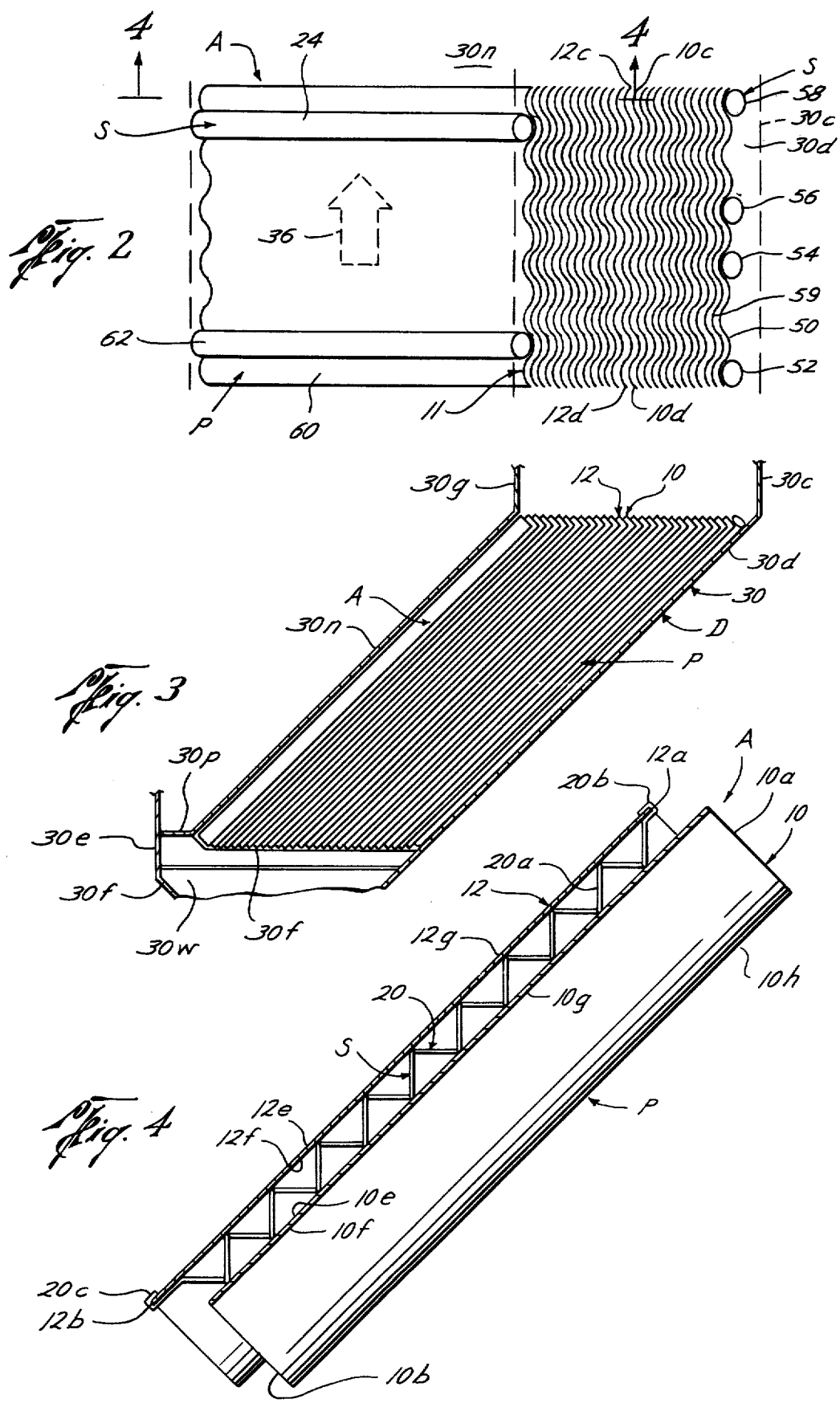

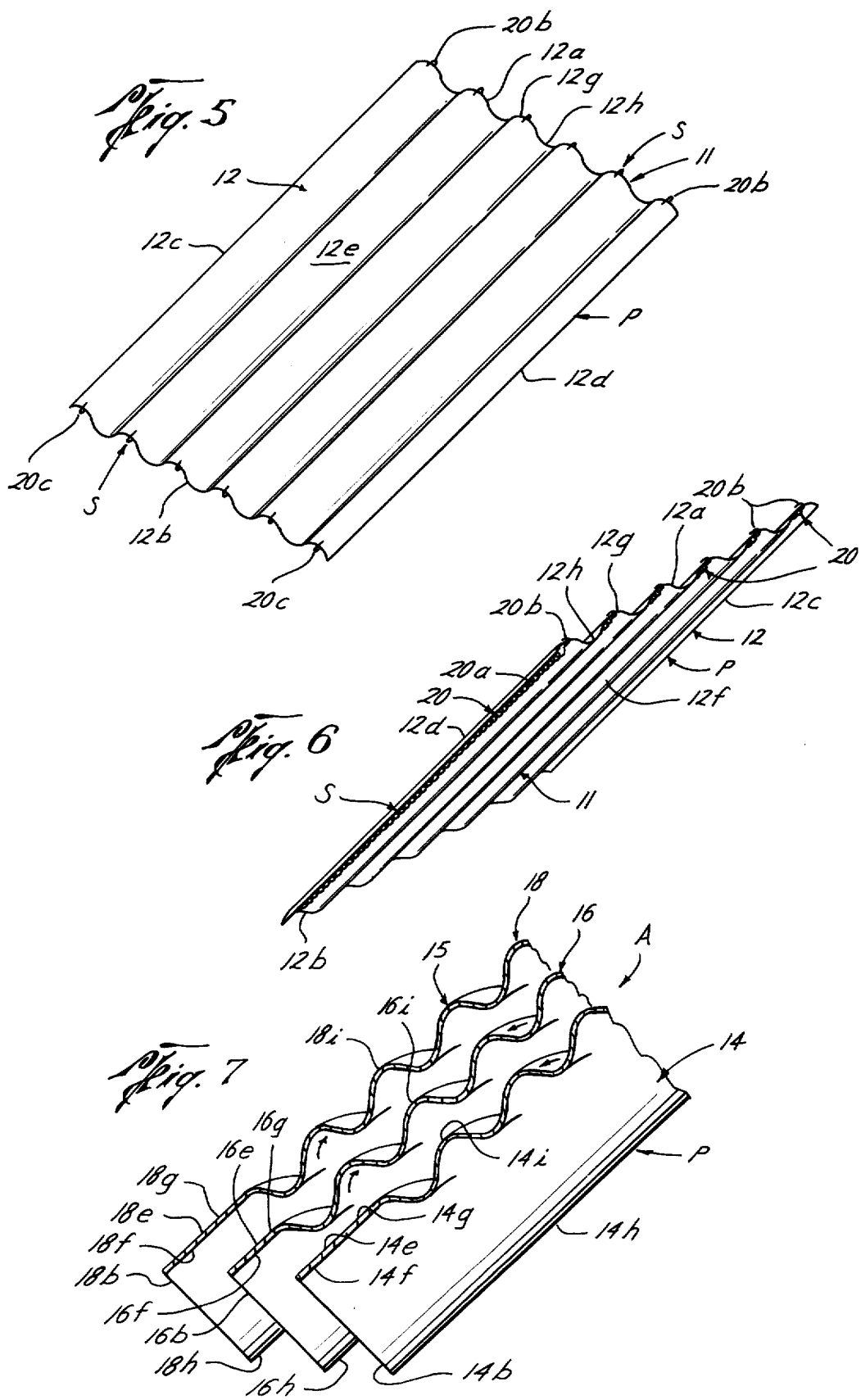

PLATE ASSEMBLY AND METHOD FOR INSTALLING SAME IN A SEPARATION DEVICE

TECHNICAL FIELD OF THE INVENTION

The field of this invention relates to separation devices for separating components from a multi-component carrier liquid with such components having a specific mass different from that of the carrier liquid, and more particularly with such separation occurring upon plate assemblies used within a cross-flow separator.

PRIOR ART

Separation devices have long been used for separating multiple components from a multi-component carrier liquid with such components having specific masses different from that of the carrier liquid. Typically, those components having a greater specific mass than that of the carrier liquid are separated into the lower portion of a separation device while those having a specific mass less than that of the carrier liquid tend to separate out at the upper portions of the separation device.

Many types of structures have been used in the past for effectuating this multi-component carrier stream separation process. In the earliest designs, the flow of the multi-component carrier liquid was in the same direction as that of the separating components, such is shown by way of example in U.S. Pat. Nos. 367,308; 2,673,451; 2,868,384; 1,864,511; 3,454,165; and 2,119,013. However, as the state of the art developed, other techniques were utilized to effectuate such separation. For example, in U.S. Pat. Nos. 1,732,386 and 3,837,501, cross-flow separation technique was utilized wherein the carrier fluid flowing into and out from the separation device flows in one direction while cross-current separation of the component parts of the multi-component carrier liquid resulted in flow of the separated components in a direction different from the carrier fluid. Multiple corrugated plates are used in U.S. Pat. No. 3,837,501 to effectuate separation during cross-flow of the separated components with respect to that of the intake and discharge of the multi-component carrier liquid. The corrugations act to enhance counter-current operation such that the heavier components of the carrier liquid precipitate in the valleys of the corrugations, hence sinking into the lower portions of the separation device while the components that are lighter than the carrier liquid collect at the peaks of the corrugations and float toward the upper extremities thereof.

Plates of various types of configuration are not unusual and their use in separation devices is shown by the various types of plate configurations disclosed in U.S. Pat. Nos. 758,484; 1,732,386; 3,346,122; 3,666,112; 3,837,501; 3,847,813; 3,899,437; 3,957,656; and 4,028,256; and French Pat. No. 1.098.155.

However, so far as is known, prior art separators require plate packs that are assembled as a modular unit for utilization within the separation device. In order to maintain, service and/or replace specific plates, the entire plate pack must be removed and the separation device shut down to effectuate such servicing thereof. Furthermore, since such plate packs are manufactured as a unit and because of differences in the components to be separated from the multi-component carrier liquid streams require different spacing between the plates, an entire plate assembly must ordinarily be removed and replaced with a new plate assembly having different plate spacing to accommodate the various different component materials to be separated from the carrier fluid. Such modular plate packs typically are heavy and require special equipment and tools to effectuate removal thereof. Furthermore, because such plate configurations and plate packs are of a modular construction, each must be specially designed for the unit to which it is to be installed and has little, if any, adaptability to a wide variety of separation devices. Also, typically field service of such modular plate assemblies is not available and time delays may be encountered in actual servicing thereof.

SUMMARY OF THE INVENTION

It is an object of the plate assembly and the method for installing same in the separation device of the present invention to provide in the apparatus a new and useful plate assembly for a separation device for effectuating enhanced separation of multi-components from a carrier fluid while additionally providing a simple, inexpensive, easy-to-install, on-site maintainable system for use within many types of the existing separation devices. The plate assembly of the present invention includes at least two separating plates adapted to be mounted within the separation device, each having first and second surfaces with the plates adjacent one another with a spacer mechanism mounted with one separating plate at the top portion and bottom portion thereof extending along the second plate surface thereof between the top portion and bottom portion for engaging and spacing the second plate surface of the separating plate from the first plate surface of the other separating plate for enhanced separation within the separation device.

It should be understood that this description of the invention is not intended to be limiting but is only exemplary of the many patentable features of this invention, which are set forth in the claims.

DESCRIPTION OF THE DRAWINGS

FIG. 1 is an isometric, diagramatical view of a separation device capable of using the plate assembly of the present invention for separating multi-components from a multi-component carrier liquid;

FIG. 2 is a plan view of the plate assembly of the present invention as schematically enclosed within the separation device of FIG. 1;

FIG. 3 is a sectional side view of the plate assembly of FIG. 2 of the present invention showing the arrangement for mounting the plate assembly within the separation device;

FIG. 4 is a sectional side view showing an enlarged portion of the plate assembly of the present invention taken along the lines 4—4 of FIG. 2 with spacer means disposed therebetween;

FIG. 5 is an isometric view of a separating plate of the present invention;

FIG. 6 is an isometric view of a separating plate of the present invention having spacer means mounted therewith; and, FIG. 7 is a sectional, fragmentary side view of a separating plate showing the ridges of the double corrugation of the separating plate of the present invention.

DESCRIPTION OF THE PREFERRED EMBODIMENT

Referring to the drawings, the plate assembly of the present invention is designated generally by the letter A. The plate assembly A is adapted to be used in a separation device D for separating components from a multi-component carrier liquid having components of a specific mass differing from that of the carrier liquid as discussed more fully hereinbelow. The plate assembly A includes generally separating plates P and spacer means S.

Typically, such separation devices D are used for separating light (that is, floating) and/or heavy (that is, precipitating) components from the carrier liquid with the separation device D used for enhancing separation of the various components from the carrier liquid within the separation device D. For example, such a separation device D may be used for separating carrier liquid of a water/oil mixture wherein crude oil from an oil well has mixed with it water, sand and/or other substances, with the separation device D being useful for separating the various components (such as the oil and sand) from the carrier liquid (such as water).

As best seen in FIGS. 4, 5 and 6, the plate assembly A of the present invention includes separating plates P including at least a first separating plate 10 and a second separating plate 12 adapted to be mounted within the separation device D for enhancing separation of the components from the multi-component carrier liquid. It is preferred that all separating plates P be of substantially identical configuration. For example, second separating plate 12 includes a top portion 12a, a bottom portion 12b, a discharge side portion 12c, an intake side portion 12d, a first plate surface 12e, and a second plate surface 12f. Preferably, the first plate surface 12e is substantially parallel with the second plate surface 12f and the top portion 12a, intake side portion 12d, bottom portion 12b, and discharge side portion 12c form the perimeter about the second separating plate 12. Similarly, first separating plate 10 includes top portion 10a (FIG. 4), bottom portion 10b, discharge side portion 10c, intake side portion 10d, first plate surface 10e, and second plate surface 10f.

Preferably, the separating plates P are formed of any suitable material capable of withstanding the corrosive and environmental effects of the carrier liquid and may include such materials as fiberglass, other plastics, stainless steel and the like. Preferably, the separating plates P are of a corrugated configuration such as separating plates 10, 12 having peaks 10g, 12g and valleys 10h, 12h, respectively, making up such corrugations designated generally as 11. Preferably, the separating plates P, such as second separating plate 12, are formed having corrugations 11 in the first plate surface 12e and second plate surface 12f with the corrugations 11 being a series of alternating peaks 12g and valleys 12h being substantially parallel with and between the intake and discharge side portions 10d, 12c extending from the top portion 12a to the bottom portion 12b. The amount of corrugation 11 or distance between the peaks 12g and valleys 12h may depend upon the type of multi-component carrier liquid to be separated. Furthermore, the overall spacing of the corrugations between the intake side portion 12d and discharge side portion 12c again is a function of the type of multi-component carrier liquid that is to be separated within the separation device D. It should be understood that the separating plate P of the present invention may also comprehend merely a flat separating plate (not shown) having no corrugations whatsoever; however, it is preferred that the separating plates P include such corrugations 11.

As shown in FIG. 7, the plate assembly A of the present invention may further include separating plates P having a double corrugation designated generally as 15. Separating plates 14, 16 and 18 are shown in FIG. 7 having the aforementioned double corrugation 15. The separating plates 14, 16 and 18 include bottom portions 14b, 16b, 18b, first plate surfaces 14e, 16e, 18e, second plate surfaces 14f, 16f, 18f, peaks 14g, 16g, 18g, and valleys 14h, 16h, 18h, respectively. In forming the double corrugation 15, the peaks 14g, 16g, 18g are formed having ridges 14i, 16i, 18i extending between adjacent valleys 14h, 16h, 18h, respectively. It is preferred that the ridges 14i, 16i, 18i are at a non-parallel angle with respect to the top portions (not shown) and bottom portions 14b, 16b, 18b of the separating plates 14, 16, 18, respectively, and at a non-perpendicular angle with respect to the intake and discharge side portions (not shown). While any suitable angle may be used, it is preferred that the ridges 14i, 16i, 18i be disposed at an angle of approximately ten degrees with respect to the top portion and bottom portion of the separating plates P to enhance the generally upward-downward flow of separated components from the multi-component carrier liquid as discussed more fully hereinbelow. While the ridges 14i, 16i, 18i are shown as being formed in the peaks 14g, 16g, 18g, of separating plates 14, 16, 18, repectively, the double corrugation 15 may also be formed within the valleys 14h, 16h, 18h, thereof as may be desired and dependent upon the criteria necessary for proper separation of the multi-component carrier liquid.

The plate assembly A of the present invention further includes spacer means S. The spacer means S may include a coil spring 20 (FIGS. 4, 6) or any other type of spacer 22 which is formed of a plurality of helical windings. Alternatively, the spacer means S may include a tubular member 24 which may be pliable, rigid, or of any other suitable configuration as discussed more fully hereinbelow. As best seen in FIG. 4, the coil spring 20 preferably includes a helically wound portion 20a with end portions 20b, 20c formed adjacent each end. It is preferred that the coil spring 20 is mountable with the separating plates P such as separating plate 12 (FIG. 4). Preferably, the end portions 20b, 20c are adapted to engage the top portion 12a, bottom portion 12b, respectively, of the separating plate 12, with the helically wound portion 20a extending between such top portion 12a and bottom portion 12b. The spacer means S is adapted to be mounted with the second separating plate 12 at the top portion 12a and bottom portion 12b and extend along the second plate surface 12f of the second separating plate 12 between the top portion 12a and bottom portion 12b for engaging and spacing the second plate surface 12f of the second separating plate 12 from the first plate surface 10e of the first separating plate 10 for enhanced separation within the separation device D. As shown in FIG. 4, the coil spring 20 of the spacer means S is mounted in the peak 12g of the second separating plate 12. Preferably, the spacer means S such as coil spring 20 is adapted to be mounted in the peaks 12g of all corrugations 11 in the separating plates P (FIG. 6).

The plate assembly A of the present invention is adapted to be mounted within a separation device D such as that shown in FIG. 1. Preferably, the components of such a separation device D are made of high strength materials capable of withstanding the corrosive effects of the carrier liquid without any adverse effects thereto. The separation device D includes a housing generally designated 10 having wall sections 30a, 30b, 30c, 30d, 30e, 30f, 30g, 30i, and top 30j forming substantially the outer portion of the housing 30 of the separation device D. It will be appreciated that wall sections 30f, 30g, 30d, 30i terminate and funnel together at the lowermost portion in a rectangular opening 30k. Wall sections 30a and 30b are preferably substantially parallel with one another as are wall sections 30c, 30e. A carrier liquid inlet 30l is mounted with wall section 30a for receiving the multi-component carrier liquid which is directed through inlet 30l into engagement with deflector 30n mounted with the wall section 30a for deflecting the incoming carrier liquid in the direction of arrows 32, 34.

The plate assembly A is mounted within the separation device D between the wall section 30d and plate mounting wall 30n which in turn is mounted with wall section 30a and extends therefrom to section divider 30o. Wall sections 30p, 30q are mounted with the plate mounting wall 30n, with wall section 30p extending from plate mounting wall 30n to wall section 30e, between wall section 30a and section divider 30o while wall section 30q extends between wall section 30a and section divider 30o adjacent the upper portion of the housing 30. Divider 30r is mounted with wall sections 30c, 30d 30q while wier plate 30s is mounted with wall sections 30c, 30d and internal walls 30t, 30u. A plurality of upper baffles such as 30v are mounted with wall section 30d and wall section 30q while lower baffles such as lower baffle 30w are mounted with wall sections 30d, 30e and 30f. A plate support 30x (FIG. 3) extends between plate mounting wall 30n and wall section 30d for supporting the plate assembly A of the present invention within the separation device D.

In the use or operation of the plate assembly A of the present invention within separation device D, the carrier liquid is directed within carrier fluid inlet 30l into deflector 30n resulting in fluid flow in the direction of arrows 32, 34. As a consequence, the fluid flow is dispersed by the deflector 30m resulting in flow in the direction of arrow 36 through the plate assembly A of the present invention, with such flow being across the separating plates P in the direction of from the intake side portion such as 10d, 12d, towards the discharge side portion 10c, 12d. The plate assembly A is supported within the separation device D by plate support 30x and mounted therebetween wall section 30d and plate mounting wall 30n. Separation of the heavier and/or lighter components from the carrier liquid occur within the plate assembly A of the present invention as discussed more fully hereinbelow. Thereafter, the cleansed carrier liquid flows into a chamber formed by the wall sections 30b, 30d, internal walls 30u, 30t and wier plate 30s, over the wier plate 30s in the direction of arrow 38 into the chamber formed by wall sections 30b, 30e, 30d, 30t, and 30o and thereafter from the housing 30 from carrier fluid outlet 30y to be discharged as desired.

Separation within the separation device D results in the lighter components of the carrier fluid being displaced upwardly through the plate assembly A towards the upper portion of the separation device D for accumulation thereof, with the accumulations thereof flowing in the direction of arrow 40 over plates 30z, 30aa into a chamber formed by wall sections 30a, 30e, plate mounting wall 30n, wall section 30q, wall section 30p, plates 30z, 30aa and section divider 30o for accumulation therein and ultimate flow from the separation device D from light fluid outlet 30bb. Baffles 30v prevent short circuit fluid flow within the separation device D of the present invention.

The heavy particles separated from the carrier fluid are directed into a lower chamber formed by wall sections 30f, 30g, 30d, 30i and outwardly from the separation device D through a rectangular opening 30k formed in the lowermost portion thereof. Lower baffles 30w prevent short circuiting of flow among the heavy particles separated from the carrier liquid for prevention of fluid bypass and redispersion of the solids back into the carrier liquid and consequent reentrainment thereof.

Preferably plate mounting wall 30n and internal wall 30u are substantially parallel with wall section 30d which permits the parallel disposition of the separating plates P therebetween. When installing the plate assembly A of the present invention within the separation device D, the top section 30j, baffles 30v and divider 30r need merely be removed. An initial separating plate 50 (FIG. 2) is installed having a plurality of spacer means S including tubular members 52, 54, 56, 58 abutting wall section 30d and corresponding peaks of the corrugations 11 formed in separating plate 50. The tubular members 52, 54, 56, 58 act to seal the separating plate 50 with the wall section 30 to prevent short circuit fluid flow between the separating plate 50 and wall section 30d. Such tubular members 52, 54, 56, 58 may be of a soft pliable tubular construction or of a solid pliable cylindrical material. Preferably, the coil springs (such as coil spring 20, FIG. 4) are mounted with the peaks of all corrugations 11 of the next separating plate 59 to be mounted within the separation device D. The coil spring spacer means S ensure a substantially parallel relationship between the separating plate 50 and separating plate 59. Succeeding separating plates P with the spacer means S are thereafter inserted into the separation device D until the plate assembly A of the present invention is complete with the last separating plate 60. With separating plate 60 in place, spacers 62, 24 may be appropriately positioned with such spacers 62, 24 engaging separating plate 60 and plate mounting wall 30n to provide a sealable relation therebetween. Such spacers 62, 24 act to seal and prevent fluid bypass about and between the separating plate 60 and plate mounting wall 30n. Thus, the plate assembly A of the present invention is built up on the basis of the individual one at a time insertion of separating plates P having spacer means S mounted therewith, with such being positioned within the separation device D individually rather than requiring an entire modular plate pack to be removed and/or inserted at a single time. Accordingly, by merely varying the diameter of the coil spring spacer means S, spacing between adjacent separating plates P may be easily adjusted. Furthermore, should particular separating plates P become clogged or damaged, such may easily be removed without requiring removal of the entire plate assembly A.

The coil spring spacer means S of the present invention not only ensures a substantially parallel relation between adjacent separating plates P but also enhances separation of the multi-component carrier liquid stream into the respective lighter and heavier portions thereof. Specifically, the coil spring spacer means S acts as a spacing mechanism for the establishment of collateral separation chambers between the separating plates P within the separation device D. The coil spring (i.e. spring 20) enhances the liquid-liquid separation that occurs between a chamber formed between adjacent coil springs and the parallel corrugations 11 therebetween, in that the coil spring acts as a coalescing element wherein separation of the heavier/lighter component parts of the carrier liquid may be gathered. Typically, the lighter component parts will tend to float to the peaks (i.e. 10g, 12g) of the corrugations 11 of the separating plate P whereas the heavier component parts will sink into the valleys (i.e. 10h, 12h) of the corrugations 11. As a consequence, the peaks direct the lighter component parts to the upper portion of the separation device D while the valleys direct the heavier component parts of the carrier liquid into the lower portions thereof. Furthermore, this design allows adjustments in the handling capacity of the separation device D without special tools and reduces design dictates from that of modular construction to that of a single chamber construction. Spacer means S of various diameters may be used as a means of adjusting the distance between each separating plate P as is necessary. By use of an appropriate shim, the angle at which the separating plates P may be installed within the separation device D may be varied without requiring special tooling or the like.

The plate assembly A of the present invention is easily adaptable to existing tank configurations, be they rectangular, cylindrical or otherwise in addition to existing concrete construction basin type separation devices D. Furthermore, the plate assembly A of the present invention is adapted for use in counterflow as well as cross-flow types of separation devices D. Thus, the plate assembly A of the present invention establishes its own structure as it is assembled within the separation device D by means of the alternating separating plates P and spacer means S and may be further disassembled for maintenance and reassembly on site without requiring special tools or handling equipment. Thus, as distinguished from the modular construction of the prior art, the plate assembly A is adapted to be inserted into the separation device D on the basis of a single separating plate at a time for establishing the parallel plate assembly A of the present invention for separating a multi-component carrier liquid. Further, the coil spring spacer means S affords a supporting mechanism that is capable of having many points of contact, yet being of an open cross section resulting in little or no restriction to the carrier liquid flow. This spacer means S further enhances separation of liquid/liquid phases of dissimilar specific masses because of the repeated contact and exposure of the contaminant liquid within the carrier liquid to the surface of the coil springs between the separating plates P which as such act as a coalescing element between the separating plates P.

Thus, the plate assembly A of the present invention provides a new, useful improved parallel plate assembly adapted for use within a separation device D.

The foregoing disclosure and description of the invention are illustrative and explanatory thereof, and various changes in the size, shape and materials as well as in the details of the illustrated construction may be made without departing from the spirit of the invention.

I claim:

1. A plate assembly for use in a cross flow separation device for separating components from a carrier liquid having components of a specific mass differing from that of the carrier liquid, comprising:

at least a first separating plate and a second separating plate adapted to be mounted within the separation device for enhancing separation of the components from the carrier liquid;

each of said separating plates having a top portion, an intake side portion, a bottom portion, a discharge side portion, a first plate surface, and a second plate surface;

each of said separating plates formed with said first plate surface being substantially parallel with said second plate surface;

said top portion, said intake side portion, said bottom portion, and said discharge side portion forming the perimeter of each of said separating plates;

said second plate surface of said first separating plate adapted to be disposed adjacent said first plate surface of said second separating plate within the separation device; and, elongate spacer means mounted with said second separating plate at said top portion and said bottom portion and with the longitudinal axis of said spacer means extending along said second plate surface of said second separating plate between said top portion and said bottom portion for engaging and spacing said second plate surface of said second separating plate from said first plate surface of said first separating plate for enhanced coalescing and separation of the components from the carrier liquid within the separation device.

2. The plate assembly of claim 1, wherein:

said separating plates are formed having corrugations in said first and second plate surfaces with said corrugations being a series of alternating peaks and valleys substantially parallel with and between said intake and discharge side portions from said top portion to said bottom portion.

3. The plate assembly of claim 2, wherein:

said peaks of said separating plate are formed having ridges extending between adjacent valleys.

4. The plate assembly of claim 3, wherein:

said ridges are at a non-parallel angle with respect to said top portion and said bottom portion of said separating plate and a non-perpendicular angle with respect to said intake and discharge side portions.

5. The plate assembly of claim 2, wherein:

said spacer means is disposed between said first separating plate and said second separating plate in said peaks of said corrugations.

6. The plate assembly of claim 1, wherein:

said spacer means includes a spacer formed of a plurality of helical windings.

7. The plate assembly of claim 6, wherein:

said spacer includes a coil spring.

8. The plate assembly of claim 1, wherein:

said spacer means includes a spacer formed of a tubular member.

9. The plate assembly of claim 1, wherein:

said spacer means acts as a coalescing element within the separation device.

10. A method for installing a plate assembly of a plurality of separating plates each having a top portion, an intake side portion, a bottom portion, a discharge side portion, a first plate surface and a second plate surface in a cross flow separation device, comprising the steps of:

disposing a first separating plate within the cross flow separation device;

affixing an elongate spacer with a second separating plate at the top and bottom portions thereof and with the longitudinal axis of said spacer extending along the second plate surface of the separating plate between the top and bottom portions; and, inserting the second separating plate into the separation device with the elongate spacer engaging and spacing the second plate surface of the second separating plate from the first plate surface of the first separating plate for enhancing coalescing and separation of the components from the carrier liquid within the separation device.

11. The method of claim 10, further including the step of:

sealing the first separating plate with the separation device with a longitudinal flexible spacer mounted between the second plate surface of the first separating plate and the separation device, after said disposing.

12. The method of claim 10, further including the steps of:

affixing spacers with a plurality of individual separating plates at the top and bottom portions thereof and extending along their respective second plate surfaces between the top and bottom portions; and, inserting the separating plates individually, one at a time, into the separation device, with the spacers engaging and spacing adjacent second plate surfaces from first plate surfaces of adjacent separating plates for enhancing separation within the separation device.

13. The method of claim 10, wherein said affixing includes the step of:

mounting a helically wound spacer with the separating plate.

14. The method of claim 10, further including the step of:

forming, prior to said disposing, the separating plates having double corrugations in the first and second plate surfaces with the double corrugations being a series of alternating peaks and valleys being substantially parallel with and between the intake and discharge side portions from the top portion to the bottom portion and having ridges extending between adjacent valleys on each separating plate.

* * * * *